3,029,182
ZINC PHOSPHIDE PESTICIDE
Edward D. Weil, Lewiston, N.Y., assignor to Hooker Chemical Corporation, Niagara Falls, N.Y., a corporation of New York
No Drawing. Filed Apr. 19, 1960, Ser. No. 23,152
3 Claims. (Cl. 167—14)

This invention relates to methods for the control of plant diseases caused by attack of microscopic or nearly microscopic pathogens. More specifically, the concept of this invention resides in the use of phosphine or phosphides to prevent or control plant diseases caused by fungi and/or nematodes.

It has been found that nematodes and soil fungi frequently act together to attack and destroy plant tissues. It is not uncommon for nematodes to puncture the cortical layers of roots thereby allowing points of entry for pathogenic fungi. Also, root systems weakened by fungal damage may fall prey more readily to attack by pathogenic nematodes.

In crop protection against these soil pathogens various agricultural practices have been employed. Crop rotations have been practiced which include at least one crop which does not serve as host to the pathogens. The breeding of resistant strains has occasionally met with some success, but more frequently has been a failure. In many cases infested land must be permanently abandoned insofar as its use for growing the disease-susceptible crops is concerned. Where the value of the land is high or where expensive crops are involved, chemical measures for crop protection have been found more economically desirable. However, since these same chemicals are generally toxic to the crop plants, it is the customary practice to introduce the chemical several weeks before planting the crop, allowing time for the chemical to dissipate. This waiting period is a disadvantage to the farmer since it introduces an undesirable delay or shortening of his growing season. In the case of perennial crops, the use of phytotoxic nematocidal fumigants is of course virtually precluded. In the control of citrus nematodes, the only practicable way to use the fumigants has been to destroy the existing diseased plant, fumigate the soil and then replant with fresh nursery stock. A major need exists in the field for a fumigant which is highly toxic to nematodes and not toxic to crop plants.

It has now been found that phosphine exhibits the properties of a selective plant protectant against nematodes and pathogenic fungi. It is known that phosphine is toxic to insects and to mammals but there is no indication in the prior art as to its behavior toward pathogenic lower organisms and vegetation. The known insecticides such as, for example, DDT, pyrethrum, lindane, malathion, etc. are not active toward the taxonomically-remote nematodes nor toward fungi (which are members of the plant kingdom), and it would not therefore be predictable that phosphine would be a nematocide or fungicide. It would, in fact, be even further unpredictable that both phosphine and phosphides would be a selective nematocide-fungicide having utility on living plants.

Phosphine is known to be produced conveniently by the reaction of phosphides with water or with acids. Phosphides which react rapidly with water include alkali metal phosphides, alkaline earth phosphides, and aluminum phosphide, as well as organic phosphides such as chloroacetyl phosphide. Phosphides which release phosphine only slowly with water and usually more rapidly with acids, include zinc phosphide, iron phosphide, nickel phosphide, and other heavy metal phosphides as well as organic phosphides such as tris(benzoyl) phosphide. Phosphine may also be produced by other known reactions such as that of phosphorus with strong aqueous bases.

An especially effective phosphide has been found to be zinc phosphide. It is difficult to explain the enhanced effectiveness of this phosphide relative to other phosphides. The particular efficacy of this phosphide as a protectant for plants versus nematode and fungus diseases is fortuitous in that this compound is commercially available (as a rodenticide) and is relatively safe to handle, ship, and store since is does not evolve phosphine at any appreciable rate when exposed to moist air (as do many of the other phosphides).

It has been found that phosphine gas is preferred in many situations embodied within this invention. The gas may be prepared beforehand, cooled and compressed to a liquid, and brought to the site of usage in a cylinder. It may be evolved at the site of usage in a gas generator comprising a container of a phosphide into which water or an acid is introduced, the evolved phosphine being conducted into the soil via an injection pipe. This is a particular efficacious means for the eradication of pathogens from the root zone of a tree. The phosphine may be evolved within the soil by placing one or more of the above-mentioned phosphides in the soil thereby subjecting said phosphide to the action of the mixture and/or acidic substances present in the soil. A modification of this procedure is to coat or encapsulate crop seeds with a phosphide prior to planting. The use of phosphine is particularly advantageous when used in the fumigation of the root zones of established plants such as trees. This gas may be injected deeply into the soil by means of a pipe from a portable source such as a cylinder or a phosphine generator. The advantage of this procedure is that no non-volatile substances are thereby introduced into the soil which is being fumigated, and no residual toxicity problems are experienced as when using the phosphides. The phosphine gas may also be admixed with liquefied anhydrous ammonia and injected into the soil using the techniques which are now used for the introduction of anhydrous ammonia commonly employed as a fertilizer. Phosphides on the other hand when used give as byproducts of their decomposition in the soil metal oxides or metal salts which may in many circumstances pose a toxicity problem.

Rates of five to several hundred pounds per acre of phosphine (on an overall coverage basis) are suitable, with rates in the ten to two hundred and fifty pound range being preferred. The optimum rate will depend on soil type, pathogen and host species, and degree of control required. If seed treatment, row treatment or spot treatment is used, the actual per-acre rates will be lowered, since the entire area is not permeated by the chemical but only the vicinity of the seedlings.

*Example 1*

To a solution of one hundred and thirty parts per million of phosphine gas in distilled water was added a suspension of *panagrellus redividus*, a saprophytic nematode. After twenty hours, microscopic examination showed all the organisms to be immobile and therefore killed. In distilled water alone, the nematode exhibited their characteristic body flexure without impairment.

*Example 2*

Soil infested with *meloidogyne incognita* (a plant pathogenic nematode which is causative of root knot disease) was admixed with various metal phosphides in finely divided or granular state, and the treated soil placed in pots of one quart capacity. After four days were allowed for the action of the chemical, tomato seedlings were transplanted into the treated soil and allowed to grow for three weeks under normal greenhouse conditions.

The roots were then examined and the extent of root knot disease was evaluated relative to untreated nematode-infested controls. The results were rated on a scale of nematode-produced root damage as follows: 0=no damage, 1=slight damage, 2=moderate damage, 3=severe damage. The plants were also examined for evidences of phytotoxicity (malformation; discoloration, stunting).

| Compound | Rate (mg./quart of Soil) | Root Damage | Evidence of Phytotoxicity |
| --- | --- | --- | --- |
| Aluminum Phosphide | 125 | 1 | None |
| Zinc Phosphide | 125 | 0 | None |
| Cuprous Phosphide | 125 | 1 | None |
| Cupric Phosphide | 125 | 1 | None |
| Magnesium Phosphide | 125 | 1 | None |
| Ferrous Phosphide | 125 | 2 | None |
| Nickel Phosphide | 125 | 2 | None |
| Chromium Phosphide | 125 | 2 | None |
| Check (no chemical) | | 3 | |

125 mg./quart is equivalent to approximately one hundred and eighty pounds per acre mixed to a six inch depth.

*Example 3*

Aluminum phosphide and zinc phosphide were added to nematode-infested soil at the rate of one gram per quart of soil, mixed, and then immediately planted with seeds of cucumber, cotton, peas and soybeans, and with small seedlings of tobacco. Normal growth ensued, with substantial repression of root knot disease in the case of the aluminum phosphide and essentially one hundred percent supression in the case of the zinc phosphide. No phytotoxicity was observed with either phosphide on cucumber, peas, cotton, soybeans, and tobacco.

*Example 4*

Soil infested with the causative pathogens of root knot disease was admixed with powdered zinc phosphide at rates of 62.5, 125, 250 and 500 mg. per quart of soil, and after three days cucumber seeds were planted therein. Very slight root knot disease was observed after two to four weeks at the 62.5 mg. per quart rate but one hundred percent prevention of the disease was observed above this rate, with no phytotoxic effects even at the 500 mg. per quart rate, indicating a high "therapeutic index" (i.e., a high ratio of phytotoxic dose to disease preventative dose).

*Example 5*

Pea seeds were coated with finely ground zinc phosphide by tumbling the seeds with the powdered phosphide in a jar. The seeds were then planted in soil infested with *Pythium ultimum*, a pathogenic fungus causative of the plant disease known as "damping off." The treated seeds germinated and yielded normal seedlings. By comparison, untreated peas planted in this soil germinated but the seedlings failed to emerge.

Combinations of the compositions disclosed in this invention with other known herbicides, pesticides, etc., to obtain desirable combinations and properties are within the spirit of this invention. The examples of the rates and methods of this invention were meant only to illustrate and not limit this invention. Various modifications may be made without departing from the scope of this invention.

I claim:

1. A method for the protection of plants against diseases caused by soil pathogens selected from the group consisting of nematodes and fungi which comprises applying a toxic amount of zinc phosphide to the pathogen infested soil.

2. The method of claim 1 where five to five hundred pounds per acre of zinc phosphide is applied to the locus of the plant to be treated.

3. The method of claim 1 wherein five to five hundred pounds per acre of zinc phosphide is applied to the root zone of the living plant.

References Cited in the file of this patent

UNITED STATES PATENTS

| | | |
| --- | --- | --- |
| 2,419,073 | Hammer | Apr. 15, 1947 |
| 2,473,984 | Beckerton | June 21, 1949 |
| 2,502,244 | Carter | Mar. 28, 1950 |
| 2,543,580 | Kay | Feb. 27, 1951 |
| 2,779,680 | Wolf | Jan. 29, 1957 |
| 2,826,486 | Huter | Mar. 11, 1958 |
| 2,826,527 | Huter | Mar. 11, 1958 |

OTHER REFERENCES

Frear: A Catalogue of Insecticides and Fungicides, vol. I, 1948, pp. 167, 178, 168.

King: U.S. Dept. Agr. Handbook, No. 69, 1954, p. 265.

Chem. Abs. 35 6732[1]; 37 2852[3]; 36 5905[6].